United States Patent [19]

Niimi

[11] Patent Number: 5,194,793
[45] Date of Patent: Mar. 16, 1993

[54] CONTROL DEVICE FOR CONTROLLING A PLURALITY OF SERVO MOTORS AND SERVO MOTOR CONTROLLING METHOD

[75] Inventor: Yoshihiro Niimi, Toyota, Japan

[73] Assignee: Brother Kogyo Kabushiki Kaisha, Nagoya, Japan

[21] Appl. No.: 671,973

[22] Filed: Mar. 19, 1991

[30] Foreign Application Priority Data

Apr. 11, 1990 [JP] Japan .................................. 2-95384

[51] Int. Cl.$^5$ .......................................... G05B 19/407
[52] U.S. Cl. ............................ 318/568.15; 318/570; 318/573; 318/696; 318/64
[58] Field of Search .................. 318/568.15, 568.18, 318/568.22, 570, 573, 696, 64, 90, 362

[56] References Cited

U.S. PATENT DOCUMENTS

| 4,554,497 | 11/1985 | Nozawa et al. | 318/561 X |
| 4,603,284 | 7/1986 | Perzley | 318/568.18 X |
| 4,728,872 | 3/1988 | Kishi et al. | 318/568.15 X |

FOREIGN PATENT DOCUMENTS

63-146108  6/1988  Japan .
122486  1/1989  Japan .

Primary Examiner—A. Jonathan Wysocki
Assistant Examiner—Brian Sircus
Attorney, Agent, or Firm—Oliff & Berridge

[57] ABSTRACT

A servo motor control device includes a commanding section for outputting a move command signal to drive and control a plurality of servo motors. An interpolating section is provided for performing interpolation based on the move command signal output by the commanding section, and for outputting an interpolating signal based on that interpolation. The interpolating section is capable of performing circular arc interpolation when the commanding section outputs a circular arc move command signal. A distributing section outputs distribution pulse trains into each of the servo motors based upon the interpolating signal output by the interpolating section and an acceleration and deceleration time constant which is also received by the distributing section. The value of the acceleration and deceleration time constant is determined and adjusted by an acceleration and deceleration time constant determining section. The value of the acceleration and deceleration time constant is set to a predetermined initial value. The acceleration and deceleration time constant determining section controls and adjusts the value of the acceleration and deceleration time constant at least at the start of circular arc interpolation and at the stopping thereof. The stopping of the circular arc interpolation can occur upon the completion of the circular arc interpolation by the interpolating section or by the input of a stop command from the commanding section. Accordingly, the value of the acceleration and deceleration time constant is closely controlled to minimize stress on the drive mechanisms during stopping and starting thereof, while providing smooth and accurate arcs.

13 Claims, 5 Drawing Sheets

CONTROL DEVICE FOR CONTROLLING A PLURALITY OF SERVO MOTORS AND SERVO MOTOR CONTROLLING METHOD

BACKGROUND OF THE INVENTION

1. Field of the Invention

This invention relates to a control device for controlling a plurality of servo motors and a servo motor controlling method, and in particular to a control device for controlling and driving a plurality of servo motors to move an object to a predetermined position in a mechanical coordinate system and the servo motor controlling method used in the control device.

2. Discussion of the Related Art

Machine tools conventionally have a tool for tooling a workpiece and a table for supporting the workpiece. The machine tool is equipped with a servo motor control device for driving and controlling a plurality of servo motors to move an object such as a tool or a table in any direction within X-, Y- and Z-axes that constitute a mechanical coordinate system. When the servo motors are driven and controlled in such a manner by the servo motor control device, the object is moved to any desired position in the mechanical coordinate system.

The table of the typical machine tool is connected to a servo motor that drives the table along the X-axis and to another servo motor that drives the table along the Y-axis. Under control of the servo motor control device which controls both servo motors, the table follows composite movements in the X and Y directions.

The servo motor control device conventionally comprises a commanding section for outputting a move command signal to drive and control the servo motors, and an interpolating section for performing interpolation based on the move command signal input from the commanding section, and for outputting an interpolating signal based on the interpolation. The interpolating section is capable of performing circular arc interpolation when the commanding section outputs a circular arc move command signal.

The device further comprises distributing sections for outputting distribution pulses into the servo motors each distribution pulse being based on the interpolating signal input from the interpolating section. Applying sections, which are interposed between the interpolating sections, and the distributing sections apply acceleration and deceleration time constants to the interpolating signals output from the interpolating sections and output the so modified interpolating signals into the distributing sections.

The typical device comprises comparators which subtract feedback signals, supplied by encoders equipped with each of the respective servo motors, from the distribution pulses output from the distributing sections and output a signal. Amplifiers amplify the comparator outputs for driving and controlling each of the respective servo motors.

Conventionally, the servo motors for driving the X-and Y-axes are each assigned an acceleration and deceleration time constant. That is, under servo control, the acceleration and deceleration time constant is used to soft-start and soft-stop the object being moved. This arrangement allows the mechanisms of the machine tool to start gently (soft start) and to stop gently (soft stop) so that they will not be damaged.

However, there is one disadvantage involved in using the above-described acceleration and deceleration time constant. Assume that during a circular arc interpolation situation such as is shown FIG. 4, a circular arc interpolation command is issued to move the object from point P1 to point P2 at a velocity F on a circular arc locus C0 with a radius R0 (shown in solid line). Under previous servo control, the above-mentioned acceleration and deceleration time constant remains (as its name implies) constant, regardless of the type of interpolation (circular arc or linear). Given a command signal from the servo control device, the object under control such as the tool does not move in real time; there always exists a time lag between the issuance of a command and a tool movement. When an acceleration and deceleration time constant is applied to the above circular arc interpolation, with the radius R0 significantly small or the feed velocity appreciably high, the actual locus that the tool follows is C1 with a radius R1.

Figure 4:
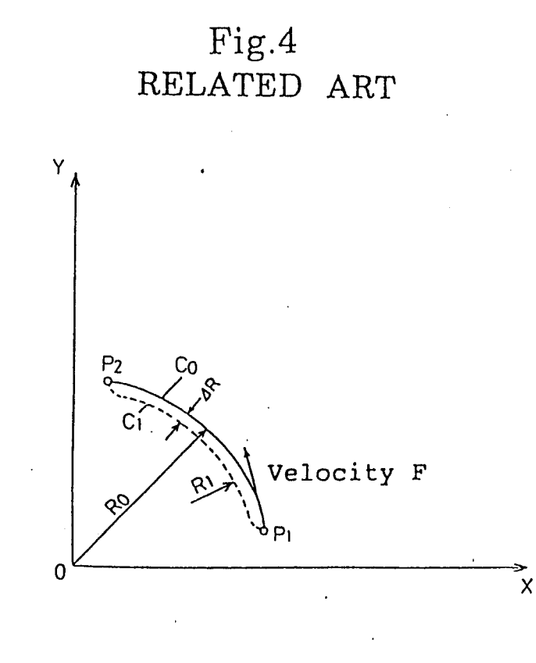
FIG. 4 is a view illustrating how a radius error occurs in a typical prior art example of circular arc interpolation.

The locus "shrinks" radially, leaving behind a large error $\Delta R$ ($=R0-R1$). The radius error $\Delta R$ is expressed by the equation described below:

$$\Delta R \approx (\tau r^2 + \tau P^2) F^2 / (2 \cdot R)$$

where, R stands for the circular arc radius, F for the velocity, "$\tau r$" for the acceleration and deceleration time constant and "$\tau P$" for the time constant of the positioning system in use.

When circular arc interpolation is carried out as described above using the acceleration and deceleration time constant "$\tau r$" having a large value the above-mentioned soft-start and soft-stop of the controlled operations are accomplished. This protects the mechanisms of the machine tool. However, a large radius error in operation accuracy results.

A number of solutions have been proposed to prevent the above-noted radius error. One solution is disclosed in Japanese Laid-open Patent No. 63-146108. According to this solution, the servo control device uses a different time constant of acceleration and deceleration for each of the servo motors that drive the X- and Y-axes depending on the type of interpolation being performed (linear or circular arc). In the above setup, the radius error may be minimized, for example, by setting as small an acceleration and deceleration time constant as possible for circular arc interpolation.

However, the above setup still has impediments, including the need to soft-start and soft-stop the delicate and costly machine tool to protect the mechanisms thereof. Making the time constant smaller means making the mechanisms accelerate and decelerate more abruptly and thus stressfully. Accordingly, a limit to minimizing the time constant of acceleration and deceleration must be provided in the above-noted device.

As described, the use of small acceleration and deceleration time constants only, while permitting good circular arc interpolation, will sacrifice mechanical protection of the machine tool. This will leave the machine tool vulnerable to damage of its mechanisms.

OBJECTS AND SUMMARY OF THE INVENTION

It is an object of the present invention to overcome the above described drawbacks and disadvantages, and to provide a control device for controlling a plurality of servo motors that minimizes the radius error resulting from circular arc interpolation while accomplishing the conventional soft-start and soft-stop in starting and stopping the mechanisms incorporating the servo motors, so that the mechanisms are not damaged by abrupt operations.

It is another object of the present invention to provide a control device for controlling a plurality of servo motors that minimizes the radius error resulting from circular arc interpolation of the object under servo control while gradually starting and stopping the mechanisms connected to the servo motors for suitable protection thereof.

It is a further object of the present invention to provide a servo motor controlling method for the servo motor control device described above.

To attain these and other objects, and to overcome the shortcomings discussed above, according to the present invention, there is provided a control device, connected to a plurality of servo motors, for controlling the plurality of servo motors comprising: commanding means for outputting a move command signal to drive and control the servo motors; interpolating means for performing interpolation based on the move command signal input from said commanding section, and for outputting an interpolating signal based on the interpolation, said interpolating means being capable of performing circular arc interpolation when said commanding means outputs a circular arc move command signal; distributing means for outputting a distribution pulse train for each of the servo motors, each pulse train being determined based on the interpolating signal input from said interpolating means and an acceleration and deceleration time constant; (i.e., time period) and acceleration and deceleration time constant (time period) determining means for determining and adjusting the duration of the acceleration and deceleration time constant (time period) from a star of a circular arc interpolation to an end of the circular arc interpolation performed by said interpolating means, said end occurring by one of completion of said circular arc interpolation by said interpolating means and an input of a stop command from said commanding means.

According to one aspect of the invention, there is provided a control device, connected to a plurality of servo motors, for controlling the plurality of servo motors which comprises: commanding means for outputting a move command signal by which to control and drive the servo motors; interpolating means for performing circular arc interpolation based on the move command signal output by the commanding section; distributing means for outputting distribution pulses (or pulse trains) for each servo motor by applying an acceleration and deceleration time constant to an interpolation signal output by the interpolating means; and acceleration and deceleration time constant determining means which, when the distributing means outputs distribution pulses, gradually reduces the value of the acceleration and deceleration time constant from an initial predetermined value immediately upon the start of a circular arc interpolation until a time constant of either zero or another predetermined minimum value is set.

According to another aspect of the invention, there is provided a control device, connected to a plurality of servo motors for controlling the plurality of servo motors comprising: commanding means for outputting a move command signal to control and drive the servo motors; interpolating means for performing circular arc interpolation based on the move command signal output by the commanding means; a distributing means for outputting distribution pulses by applying an acceleration and deceleration time constant to the interpolation signal output by the interpolating means; and an acceleration and deceleration time constant determining means which, when the distributing section outputs distribution pulses, immediately resets the value of the acceleration and deceleration time constant to an initial predetermined value immediately upon completion of the circular arc interpolation, or upon the input of a stop command, wherein the acceleration and deceleration time constant determined by the acceleration and deceleration time constant determining means is applied by the distributing section in determining the distribution pulses.

In a further aspect of the invention, the distributing means preferably accumulates a supply of pulses (hold pulses) the number of which is determined based on the distribution pulses output by the interpolating means during circular arc interpolation, and distributes these hold pulses immediately upon completion of the circular arc interpolation or upon the input of a stop command while using the initial predetermined value for the acceleration and deceleration time constant which is re-established by the acceleration and deceleration time constant determining means.

According to the invention, there is provided a control device for controlling a plurality of servo motors whereby circular arc interpolation of the object under control is soft-started using an initial predetermined acceleration and deceleration time constant which is sufficiently large to prevent damage to the components of the drive system. The acceleration and deceleration time constant is re-calculated (reduced in value) thereafter by an acceleration and deceleration determining means when circular arc interpolation is being performed. The recalculation is followed by a transition to a steady state in which the acceleration and deceleration time constant becomes zero or another predetermined minimum value.

When the acceleration and deceleration time constant "$\tau r$" has a low value, the solution resulting from the application of the time constant to the above-described equation:

$$\Delta R \approx (\tau r^2 + \tau P^2) F^2 / (2 \cdot R)$$

is also low. Thus the radius error $\Delta R$ is reduced. During circular arc interpolation in the steady state (when the acceleration and deceleration time constant has a low value), the interpolation signal from the interpolating means provides a smooth curve similar to a sine curve. This prevents the mechanisms of the servo system from being subjected to stressful shocks due to abrupt operations.

Additionally, according to the invention, there is provided a control device for controlling a plurality of servo motors wherein an acceleration and deceleration time constant that was set to zero or another predetermined minimum value is reset to an initial predetermined acceleration and deceleration time constant (which has a higher value) immediately upon completion of circular arc interpolation or upon a command-designated stop, thus allowing the object under control to be gently stopped. In the steady state which follows the start of the above described circular arc interpolation, the setting of the acceleration and deceleration time constant to zero or another predetermined minimum value reduces the solution of the above-mentioned equation for $\Delta R$. Because the radius error that occurs during circular arc interpolation is thus reduced to a minimum, precise servo control is accomplished. However, after the circular arc is completed, or when the servo motors must be stopped, the acceleration and deceleration time constant is reset, to a higher value (the predetermined initial value), to prevent damage to the force transmitting mechanisms of the system.

Further, according to the invention, there is provided a control device for controlling a plurality of servo motors wherein a distributing section ensures that an adequate number of pulses are supplied or available for starting and stopping. Upon the completion of circular arc interpolation or upon the stopping thereof halfway, the hold pulses, which are accumulated by the distributing section during circular arc interpolation, are used along with an initial predetermined acceleration and deceleration time constant so as to smoothly and gently control stopping. The hold pulses held by the distributing section are smoothly distributed to the servo motors while using the predetermined acceleration and deceleration time constant so as to stop the object under control gently during or immediately after forming a curve, thereby protecting the mechanisms incorporating the servo motors.

BRIEF DESCRIPTION OF THE DRAWINGS

The foregoing and other objects, features and advantages of the present invention will become more apparent by reading the following detailed description of a presently preferred embodiment of the present invention, when considered in connection with the accompanying drawings, in which.

DETAILED DESCRIPTION OF THE PREFERRED EMBODIMENTS

Figure 1:
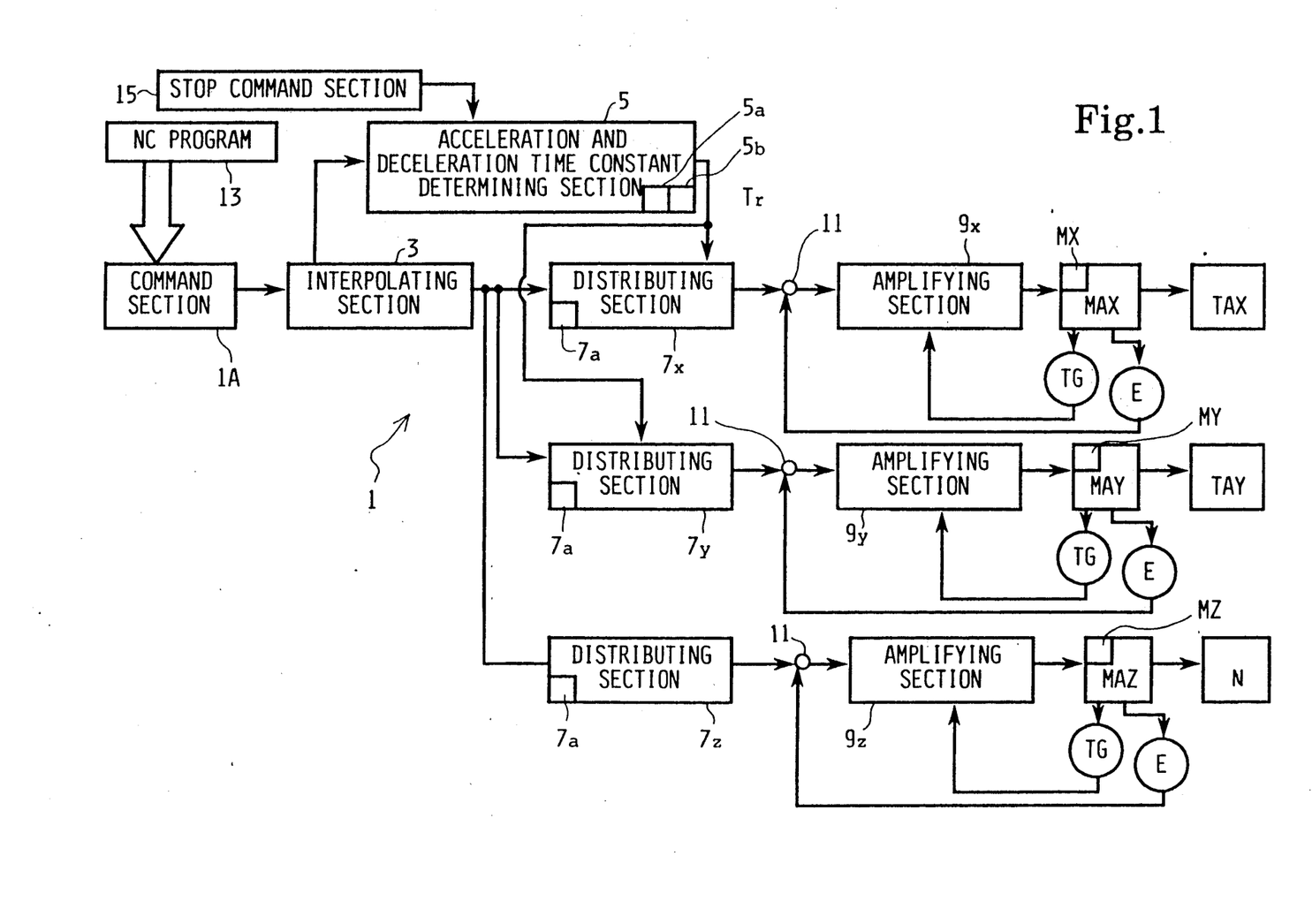
FIG. 1 is a block diagram of a servo motor control device embodying the present invention.
Figure 2:
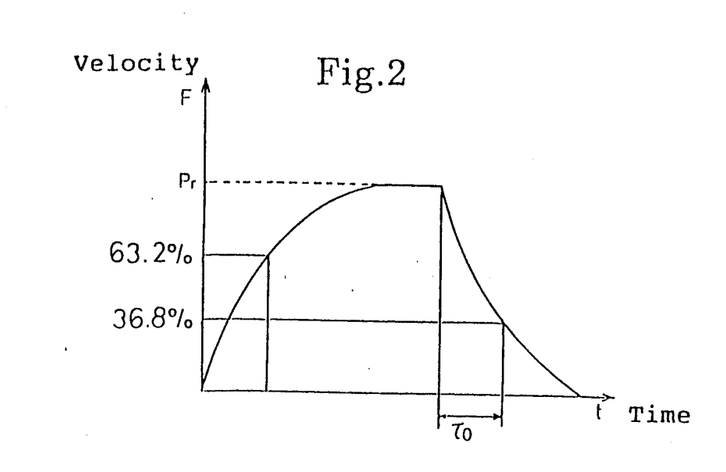
FIG. 2 is a view showing a time vs. velocity characteristic of an exponential acceleration and deceleration system.
Figure 3:
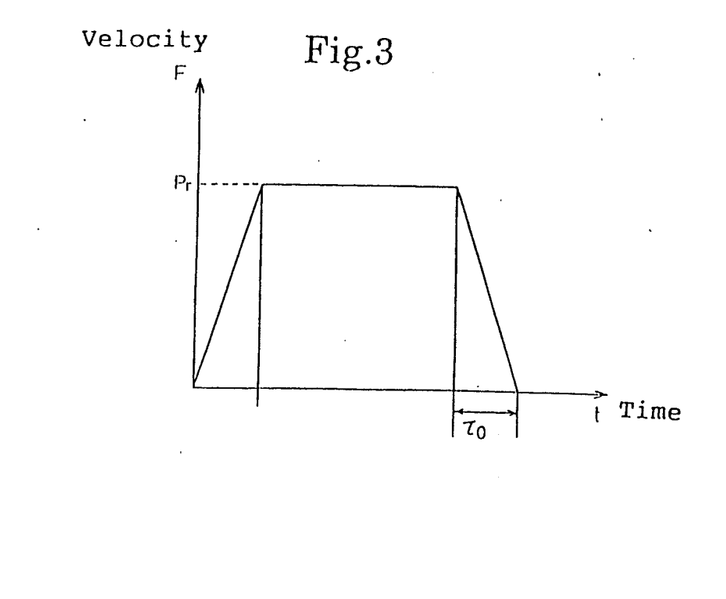
FIG. 3 is a view depicting a time vs. velocity characteristic of a linear acceleration and deceleration system.

One preferred embodiment according to the present invention is shown in FIGS. 1-3. As illustrated in FIG. 1, a servo motor control device 1 is used in, for example, a tapping machine taken as a typical example of a machine tool. The servo motor control device 1 comprises three servo motors Mx, My and Mz. These three servo motors Mx-Mz are incorporated, respectively, in mechanical transmissions MAX, MAY and MAZ which in turn correspond to the X-, Y- and Z-coordinate axes, respectively.

The servo motors Mx-Mz are each equipped with a shaft encoder E which functions as an angular position detecting means. Each of the servo motors Mx-Mz also has a tachometer generator TG. The tachometer generators TG detect actual rotational speeds of the servo motors Mx-Mz.

In the tapping machine, an X-axis driving member of the table, TAX, is connected to the mechanical transmission MAX, a Y-axis driving member of the table, TAY, is connected to the mechanical transmission MAY, and a spindle is connected to the mechanical transmission MAZ, the spindle moving in the Z-axis direction. The tip of the spindle is equipped with a tool N. The amount of movement of the tool N corresponds on each axis to the number of revolutions of each of the servo motors Mx-Mz. In this manner, the tool N is moved to a desired position in the mechanical coordinate system constituted by the X-, Y- and Z-axes. The mechanical transmissions MAX, MAY and MAZ correspond to moving means for moving an object within a mechanical coordinate system.

Movement of tool N to a target position along a movement locus is accomplished by connecting the servo motor control device 1 to a superior commanding device (command section) 1A which functions as a means for outputting a move command signal. The superior commanding device 1A issues data which is used for designating the movement locus and the target position.

The servo motor control device 1 includes an interpolating section 3 which functions as interpolating means for calculating the movement locus and the target position on each coordinate axis based on the data supplied by the superior commanding device 1A.

The interpolating section 3 is connected to distributing section 7x-7z which function as a means for outputting pulse train signals to each of the coordinate axes in accordance with the result of the calculations made by the interpolating section 3.

The command section 1A reads the contents of an (numerical control) NC program 13 and outputs command signals to the interpolating section 3, for example, to move a table (not shown) of the machine tool along a linear or circular arc locus. The table is driven by two servo motors MX and MY in the X- and Y-axis directions, respectively. The interpolating section 3 interpolates the command signal it receives and generates interpolation data which is used for driving the servo motors MX and MY on the X- and Y-axes.

Comparators 11 determine the difference between the distribution pulses output from the distributing sections 7x-7z and feedback signals output by encoders E, which are equipped with the servo motors Mx-Mz respectively.

An amplifying section 9x-9z is connected to each of the servo motors MX-MZ. The servo motors MX-MZ return a feedback velocity signal to its corresponding amplifying section 9x-9z via tachometer generator TG. The comparators 11 are connected upstream of the amplifiers 9x-9z. The comparators 11 are fed with feedback pulses as position feedback from the servo motors MX-MZ.

An acceleration and deceleration time constant determining section 5 which functions as a means for determining the acceleration and deceleration time constant is interposed between the interpolating section 3 and the distributing sections 7x-7z. The acceleration and deceleration time constant determining section 5 stores, for example, predetermined acceleration and deceleration time constants. Determining section 5 also comprises an initial acceleration and deceleration section 5a. When the interpolating section 3 interpolates a circular arc, the initial acceleration and deceleration section 5a initializes the acceleration and deceleration time constant to the predetermined initial value, e.g., "$\tau_o$" upon start of the circular arc interpolation, gradually lowers the value of the time constant and supplies the distributing sections 7x–7z with the gradually decreasing value for the acceleration and deceleration time constant. The value of the time constant continues to decrease during interpolation of the circular arc until it reaches zero or some other minimum value (about zero). The minimum value can be, for example, 5 msec.

If the predetermined initial acceleration and deceleration time constant "$\tau_o$" is, for example, 50 msec., the initial acceleration and deceleration section 5a initializes the value of the actual time constant $\tau r$ to the value of $\tau_o$ and then continuously performs the operation:

$$\tau n+1 = \tau n - 10 \text{ msec.}$$

every time 10 msec. elapses. Accordingly, 50 msec. later, the value of the actual acceleration and deceleration time constant "$\tau r$" is set to 0 msec.

The acceleration and deceleration time constant determining section 5 also contains a stopping acceleration and deceleration setting section 5b. Upon completion of the above circular arc interpolation or upon receipt of an externally supplied stop command, the stopping acceleration and deceleration setting section 5b resets the value of the actual acceleration and deceleration time constant "$\tau r$" to the predetermined initial acceleration and deceleration time constant "$\tau_o$".

The distributing sections 7x–7z apply the acceleration and deceleration time constant "$\tau r$" to the data interpolated by the interpolating section 3, and output distribution pulses accordingly to comparators 11. When moving along a curved arc, the distributing sections 7X–Z do not use all of the data provided by the interpolating section 3 which is supplied thereto (i.e., not all of the possible distribution pulses are immediately output). Instead, some of the pulses are held (or accumulated) and are distributed later as will be described below. A pulse accumulating section 7a is contained in each of the distributing sections 7x–7z. In preparation for the completion of circular arc interpolation or for the input of an externally supplied stop command the pulse accumulating section 7a ensures that there will be an adequate number of hold pulses to be used in conjunction with the predetermined initial acceleration and deceleration time constant $\tau_o$ and in conjunction with the current distribution pulses Pr. The current distribution pulse Pr is the output from the distribution sections 7x–7z, and is a command pulse for a desired amount of incremental movement for each of a series of time periods. Some of the output pulses from the interpolating section 3 are held as hold pulses in the pulse accumulating section 7a while the other remaining output pulses are output from distributing section to control tool movement.

The hold pulse accumulating section 7a calculates the hold pulses by use of the expression $$Pr \times \tau_o$$

for the exponential acceleration and deceleration system shown in FIG. 2, or by use of the expression $$\tfrac{1}{2} \times Pr \times \tau_o$$

for the linear acceleration and deceleration system depicted in FIG. 3.

The distribution pulses represent a pulse count per unit time, i.e., a velocity command directed to the amplifying section 9.

The provision of the hold pulses by accumulating section 7a allows the object being controlled by the servo motor control device to continue to move upon completion of circular arc interpolation or upon receipt of an externally supplied stop command at least far enough so that the stopping can be achieved smoothly.

The amplifying sections 9x–9z receive distribution pulses from the comparators 11. In turn, the amplifying sections 9x–9z supply the servo motors Mx–Mz with appropriate driving currents in accordance with the time constant of response (which is the inverse of position loop gain) of the particular positioning system. The comparators 11 subtract the feedback pulses from the distribution pulses, and supply the amplifying section 9x–9z with a pulse signal commensurate with the difference resulting from the subtraction.

What follows is a description of how the servo motor control device according to the invention operates. The radius error $\Delta R$ resulting from circular arc interpolation is given by the equation.

$$\Delta R \approx (\tau r^2 + \tau p^2) F^2 / (2 \cdot R)$$

wherein R is the circular arc radius, F is the velocity, $\tau r$ is the acceleration and deceleration time constant, and $\tau p$ is the time constant of the positioning unit.

The initial time constant determining section 5a gradually reduces the actual acceleration and deceleration time constant $\tau r$ upon start of circular arc interpolation using the equation $$\tau n+1 = \tau_o - n \times 10 \text{ msec.} \; (\tau r \geq 0)$$

so as to set to zero or a minimum value the acceleration and deceleration time constant "$\tau r$" applied to the above circular arc interpolation (where n=0 upon start of circular arc interpolation t0, and the value of n is incremented by one every time 10 msec elapses).

Upon completion of a circular arc or upon input of an externally supplied stop command, the acceleration and deceleration time constant "$\tau r$" having been set to zero or to a minimum value is reset to the predetermined initial acceleration and deceleration time constant $\tau_o$.

Therefore, upon start of circular arc interpolation, the movement of the object under control, e.g., X-and Y-axis tables or the tool, is gradually started using a decreasing acceleration and deceleration time constant.

Upon completion of circular arc interpolation or upon stopping by a stopping command, the distributing sections 7x–7z distribute the above-mentioned hold pulses and uses the value $\tau_o$ for performing a soft stop, since the acceleration and deceleration time constant has been reset to the initial acceleration and deceleration time constant ($\tau_o$).

In any case, the radius error $\Delta R$ is minimized while the object under control such as the X- and Y-tables or the tool is moved smoothly during circular arc interpolation. This protects the mechanisms from shocks from abrupt operations.

As becomes apparent, the radius error does not occur during linear interpolation. In that situation the acceleration and deceleration time constant $\tau_o$ is always used for pulse distribution by the distributing sections 7x–7z.

The following is a description of one example of a flow of pulses from superior commanding device 1A to comparators 11. This example is merely illustrative, not limiting, and is intended to provide a better understanding of the operation of the present invention.

The superior commanding device 1A reads data relating to movement locus and target position from the NC program 13, and issues the data to the interpolating section 3. The interpolating section 3 receives this data, performs interpolation of this data, and generates interpolation data for driving servo motors MX, MY and MZ. The interpolation data is data that represents a series of target positions of the tool on the X,Y and Z axes, respectively, for a series of time intervals each time interval having a predetermined minimum unit time, for example, 10 msec. The interpolating section 3 outputs interpolating signals relating to a number of pulses within each unit time. For example, from the start of circular arc interpolation, the interpolating section outputs, for example, an interpolating signal which represents 100 pulses from 0 to 10 msec., 200 pulses from 10 to 20 msec., and 300 pulses from 20 to 30 msec. Thus, in this example, the interpolating signal represents 600 pulses within the first 30 msec. The number of pulses represents the amount of tool movement. Thus, the greater the number of pulses, the greater amount of tool movement within a unit period of time.

The distributing sections 7x-7z receive the interpolating signals and generate pulse train signals on the X, Y and Z axes, respectively. These pulse train signals are output to the comparators 11 during a series of time intervals, each time interval having a predetermined minimum unit time of, for example, 2.5 msec. This minimum unit time is usually less than the unit time during which the interpolating signals are output. The value of the distributing pulse train signals represents the amount of tool movement.

The function of the distributing section is to control the distribution of pulse train signals in order to start and stop the tool gently. The distributing section 3 employs the acceleration and deceleration time constant $\tau\tau$ output from acceleration and deceleration time constant determining section 5, the interpolating signals, and the pulse accumulating section 7a. During circular arc movement, the accumulating sections 7a hold pulses which are held in the accumulating sections and are not immediately output by the distributing sections 7x-7z as pulse train signals. Thus the accumulating sections 7a subtract hold pulses from the interpolating signals output by interpolating section 3. In the present example, of the 100 pulses represented by the interpolating signal in the time period 0 and 10 msec, only 75 pulses, for example, are output by the distributing sections 7x-7z in the time between 0 and 10 msec. Further, these 75 pulses are distributed over four 2.5 msec time intervals depending on whether the amount of tool movement is increasing or decreasing. Thus, 25 pulses are held in accumulating sections 7a. This procedure occurs throughout circular arc movement. Upon either completion of circular arc movement, or the input of a stop command, the hold pulses are output by distributing sections 7x-7z using the predetermined initial acceleration and deceleration time constant $\tau_o$ to soft stop the tool.

Figure 5:
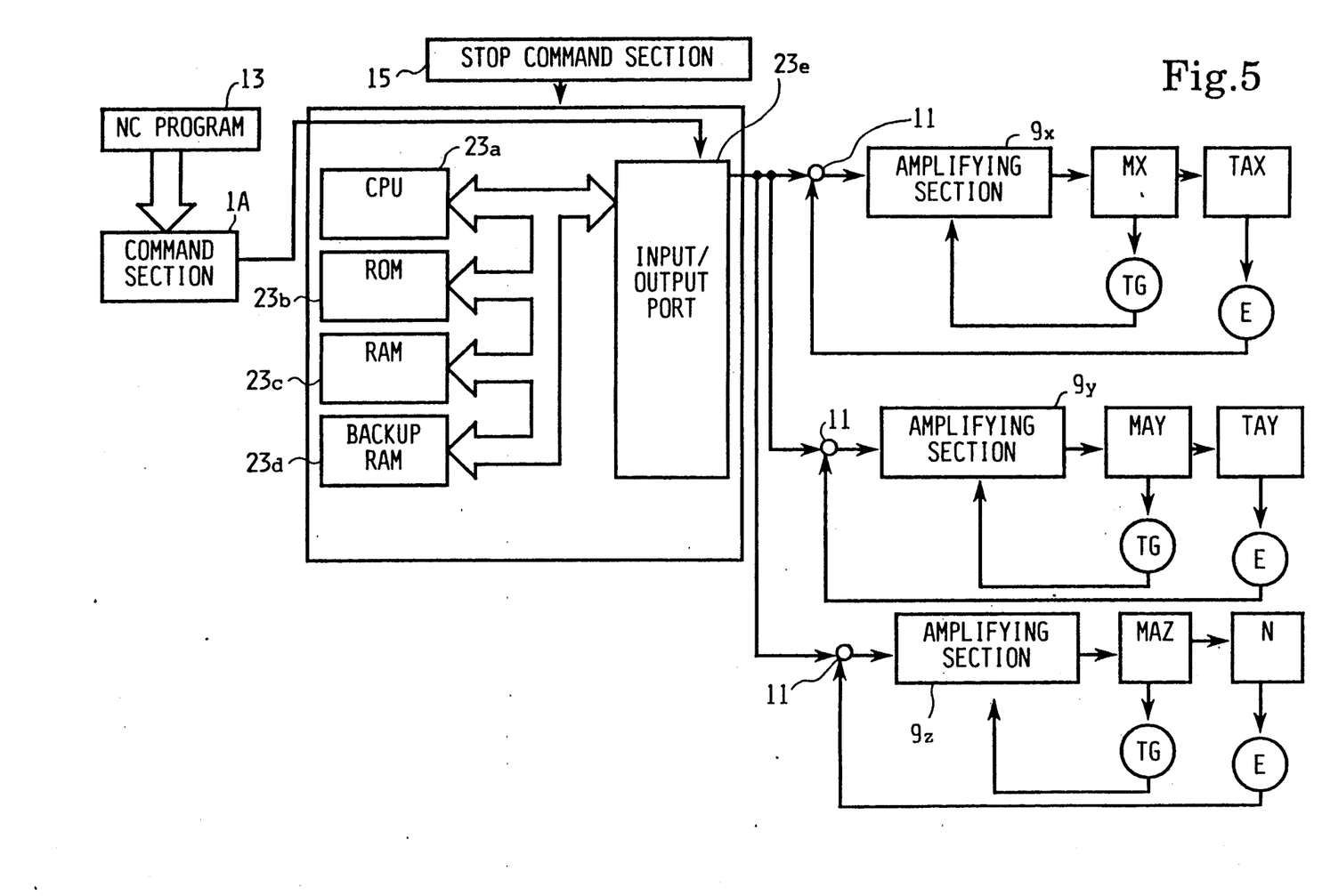
FIG. 5 is a block diagram of a servo motor control device according to a second embodiment of the present invention.

As shown in FIG. 5, the interpolating section 3, the acceleration and deceleration time constant determining section 5, and the distributing sections 7x-7z are formed by a logic operation circuit arrangement whose major components include a CPU 23a, a ROM 23b, a RAM 23c and an I/O port 23e. The CPU 23a receives move command data from the commanding section 1A via the I/O port 23e, and stores the data in the RAM 23c. The move command data is used to move the tool N along a linear or circular arc locus. The ROM 23b contains programs for making necessary calculations to obtain the data for linear or circular arc interpolation in accordance with a command-specified movement locus. The CPU 23a functions as the initial acceleration and deceleration section 5a, as the stop time acceleration and deceleration setting section 5b and as the pulse accumulating section 7a. The ROM 23b also contains programs, to be described below, for permitting the CPU 23a to perform the above functions.

When acting as the pulse accumulating section 7a, the CPU 23a performs operations to obtain the velocity data for each axis from a velocity data table in the ROM 23b. Based on the velocity data, the hold pulse accumulating section 7a decelerates the servo motors Mx-Mz with an appropriate deceleration time constant.

Figure 6A:
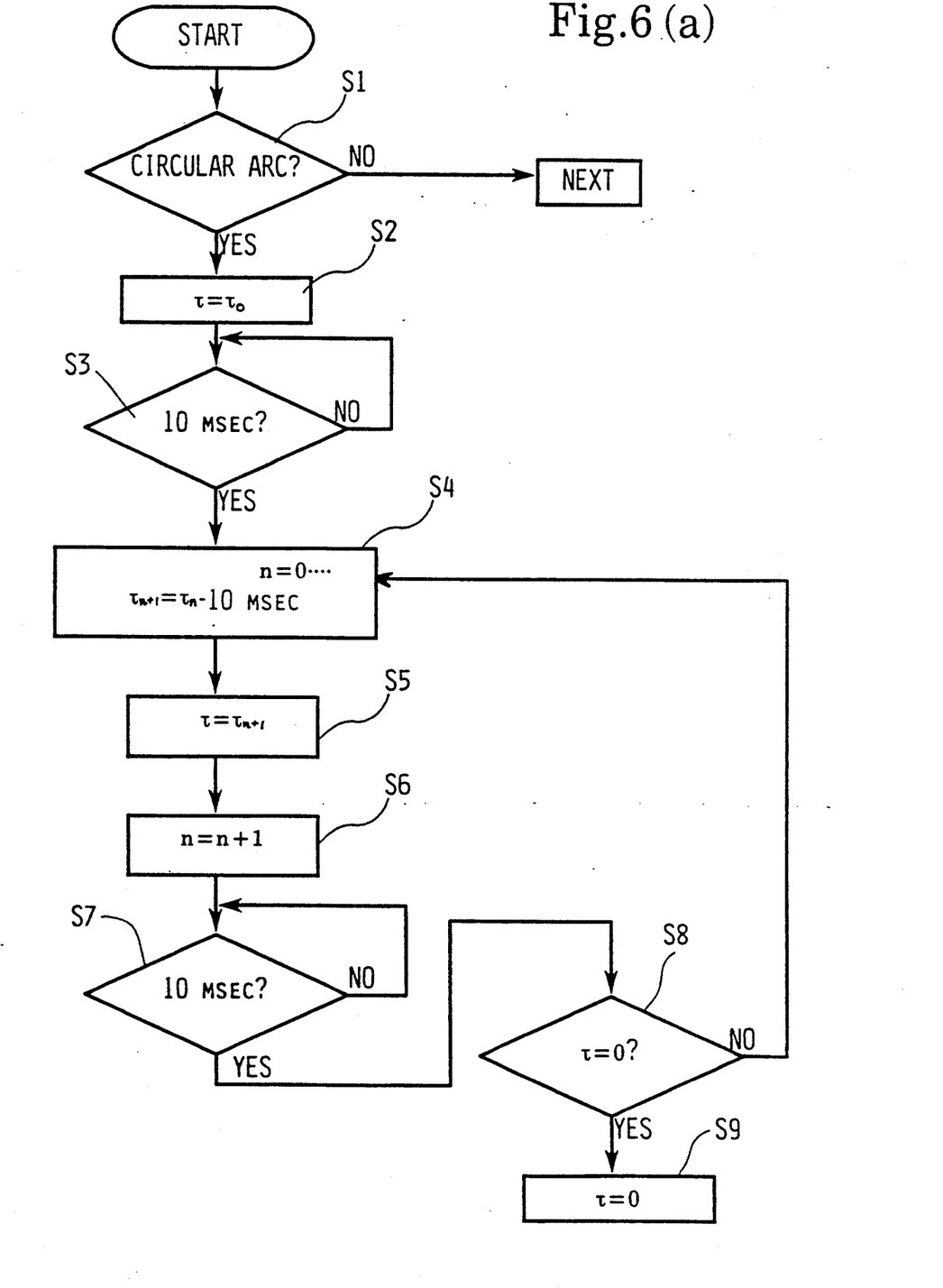
FIGS. 6(a) and (b) are flowcharts illustrating operation of the servo motor control device of the second embodiment.

Next, a start operation performed by the CPU 23a according to the above embodiment will be described with reference to FIG. 6(a). The CPU 23a determines whether a circular arc is to be performed based on a program stored in ROM 23b (Step 1). When the CPU 23a starts to execute circular arc interpolation, the CPU 23a sets acceleration and deceleration time constant to the initial predetermined acceleration and deceleration time constant $\tau_o$ (Step 2). The CPU 23a determines the passage of 10 msec (Step 3). When the CPU 23a determines the passage of 10 msec, the CPU 23a executes the equation described below (Step 4):

$$\tau n+1 = \tau n - 10 \text{ msec.}$$

(initially, n=0).

Since initially n=0, the initial value of $\tau n = \tau_o$ The CPU 23a executes the equation described below (Step 5):

$$\tau = \tau n + 1$$

The CPU 23a then increments the value of n. (Step 6). The CPU 23a determines the passage of 10 msec (Step 7). When the CPU 23a determines the passage of 10 msec, the CPU 23a determines whether $\tau = 0$ (Step 8). If $\tau = 0$ (Step 8: YES), the CPU 23a sets $\tau = 0$ (Step 9). If $\tau$ does not equal 0 (Step 8: NO), the CPU 23a returns to Step 4.

Figure 6B:
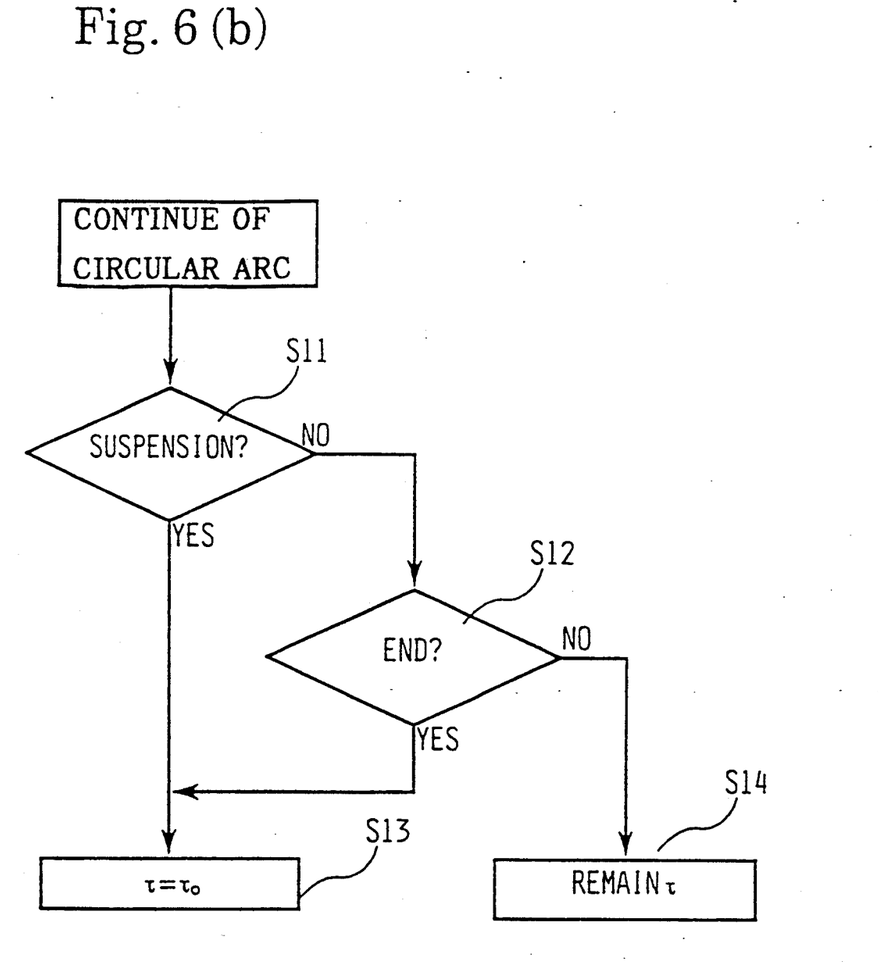

Next, a stopping operation of the CPU 23a according to the above embodiment will be described with reference to FIG. 6(b). When the CPU 23a continues to execute circular arc interpolation, the CPU 23a determines whether the circular arc interpolation has been suspended (Step 11), and/or whether the circular arc interpolation has ended (Step 12). When the CPU 23a determines suspension of circular arc interpolation (receipt of a stop command) (Step 11; YES), the CPU 23a sets the value of acceleration and deceleration time constant to the initial predetermined acceleration and deceleration time constant $\tau_o$. When the CPU 23a determines the end of circular arc interpolation (completion of the circular arc) (Step 12; YES), the CPU 23a sets the value of acceleration and deceleration time constant $\tau$ to the initial predetermined acceleration and deceleration time constant $\tau_o$. When the CPU 23a does not determine the suspension or the end of circular arc interpolation (Step 11 and 12; NO), the CPU 23a keeps the value of the acceleration and deceleration time constant at $\tau$.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A control device for controlling a plurality of servo motors comprising:

commanding means for outputting a move command signal to drive and control a plurality of servo motors;

interpolating means for performing interpolation based on the move command signal output by said commanding means, and for outputting an interpolating signal based on the interpolation, said interpolating means being capable of performing circular arc interpolation when said commanding means outputs a circular arc move command signal;

distributing means for outputting a distribution pulse train into each of the servo motors based on the interpolating signal output by said interpolating means and an acceleration and deceleration time period received by said distributing means; and acceleration and deceleration time period determining means for determining and changing the acceleration and deceleration time period at least at the start of said circular arc interpolation and at an end of said circular arc interpolation by said interpolating means so that upon the start of said circular arc interpolation, a value of said acceleration and deceleration time period decreases from a predetermined initial value to a predetermined minimal value during said circular arc interpolation, and said value of said acceleration and acceleration time period returns to said predetermined initial value when said circular arc interpolation is completed and, alternatively, when a command-designated stop occurs during said circular arc interpolation.

2. The control device as defined in claim 1, wherein the acceleration and deceleration time period determining means gradually decreases the value of the acceleration and deceleration time period from said initial predetermined value upon the start of said circular arc interpolation to said predetermined minimal value, as said distributing means outputs distribution pulses.

3. The control device as defined in claim 2, wherein said predetermined minimal value is substantially zero.

4. The control device as defined in claim 1, wherein the distributing means accumulates distribution pulses during circular arc interpolation for distribution upon completion of circular arc interpolation.

5. The control device as defined in claim 4, wherein the distributing means distributes the accumulated distribution pulses when the circular arc interpolation is completed and, alternatively, when the command-designated stop occurs during said circular arc interpolation.

6. The control device as defined in claim 4, wherein the distributing means accumulates distribution pulses based on the value of the acceleration and deceleration time period and on currently output distribution pulses.

7. A servo motor controlling method for use in a servo motor control device for controlling a plurality of servo motors, said method comprising:

outputting a move command signal by a commanding section to drive and control the servo motors;

performing interpolation based on the move command signal output by said commanding section and outputting an interpolating signal based on the interpolation by an interpolating section, said interpolating section being capable of performing circular arc interpolation when said commanding section outputs a circular arc move command signal;

outputting distributing pulses by a distributing section into each of the servo motors based on the interpolating signal output by said interpolating section and an acceleration and deceleration time period; and determining and changing the acceleration and deceleration time period by an acceleration and deceleration time period determining section at least at the start of said circular arc interpolation and at an end of said circular arc interpolation so that upon the start of said circular arc interpolation, a value of said acceleration and deceleration time period is decreased from a predetermined initial value to a predetermined minimal value during said circular arc interpolation, and said value of said acceleration and deceleration time period is returned to said predetermined initial value when said circular arc interpolation is completed and, alternatively, when a command-designated stop occurs during said circular arc interpolation.

8. The servo motor controlling method as defined in claim 7, wherein said acceleration and deceleration time period determining section gradually decreases the value of the acceleration and deceleration time period from said predetermined initial value to said predetermined minimal value upon the start of said circular arc interpolation.

9. The servo motor controlling method as defined in claim 7, wherein the distributing section accumulates distribution pulses during circular arc interpolation for distribution thereof upon completion of circular arc interpolation.

10. The servo motor controlling method as defined in claim 9, wherein the distributing section distributes the accumulated distribution pulses when the circular arc interpolation is completed and, alternatively, when said command-designated stop occurs during said circular arc interpolation.

11. The servo motor controlling method as defined in claim 9, wherein the distributing section accumulates distribution pulses based on the value of the acceleration and deceleration time period and on currently output distribution pulses.

12. A control device for controlling a plurality of servo motors comprising:

commanding means for outputting a move command signal to drive and control a plurality of servo motors;

interpolating means for performing interpolation based on the move command signal output by said commanding means, and by decreasing a value of an acceleration and deceleration time period from a predetermined initial value to a predetermined minimal value during a circular arc interpolation, and for outputting an interpolating signal based on the interpolation, said interpolating means being capable of performing circular arc interpolation when said commanding means outputs a circular arc move command signal; and distributing means for outputting distribution pulse trains into each of the servo motors based on the interpolating signal output by said interpolating means received by said distributing means, wherein said distributing means accumulates distribution pulses during circular arc interpolation, and outputs said accumulated distribution pulses when said circular arc interpolation is completed and, alternatively, when a command-designated stop occurs during said circular arc interpolation.

13. A servo motor controlling method for use in a servo motor control device for controlling a plurality of servo motors, said method comprising:

outputting a move command signal by a commanding section to drive and control the servo motors;

performing interpolation based on the move command signal output by said commanding section and by decreasing a value of an acceleration and deceleration time period from a predetermined initial value to zero during a circular arc interpolation, and outputting an interpolating signal based on the interpolation by an interpolating section, said interpolating section being capable of performing circular arc interpolation when said commanding section outputs a circular arc move command signal;

outputting distribution pulses by a distributing section into each of the servo motors based on the interpolating signal output by said interpolating section;

accumulating distribution pulses by said distributing section during circular arc interpolation; and outputting said accumulated distribution pulses when said circular arc interpolation is completed and, alternatively, when a command-designated stop occurs during said circular arc interpolation, wherein said servo motors are smoothly and gradually stopped when said circular arc interpolation is completed and, alternatively, when said command-designated stop occurs during said circular arc interpolation.

* * * * *